United States Patent
Li et al.

(10) Patent No.: US 9,866,301 B2
(45) Date of Patent: Jan. 9, 2018

(54) CHANNEL ESTIMATION TECHNIQUES FOR LSAS BACKHAUL AND THE LIKE

(71) Applicants: Alcatel-Lucent USA Inc., Murray Hill, NJ (US); Alcatel-Lucent, Boulogne Billancourt (FR)

(72) Inventors: Li Erran Li, Edison, NJ (US); Holger Claussen, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 35 days.

(21) Appl. No.: 14/670,450

(22) Filed: Mar. 27, 2015

(65) Prior Publication Data

US 2016/0285533 A1 Sep. 29, 2016

(51) Int. Cl.
*H04W 4/00* (2009.01)
*H04B 7/06* (2006.01)
(Continued)

(52) U.S. Cl.
CPC ......... *H04B 7/0626* (2013.01); *H04B 7/0452* (2013.01); *H04B 7/15507* (2013.01); *H04L 25/0224* (2013.01)

(58) Field of Classification Search
USPC ....... 370/229, 230, 236, 252, 315, 328, 329, 370/334, 491, 500
See application file for complete search history.

(56) References Cited

U.S. PATENT DOCUMENTS

| | | | | |
|---|---|---|---|---|
| 8,644,175 B2 * | 2/2014 | Sumasu | ................ | H04L 5/1469 370/252 |
| 2008/0132173 A1 * | 6/2008 | Sung | .................... | H04L 1/0019 455/67.13 |

(Continued)

FOREIGN PATENT DOCUMENTS

| | | |
|---|---|---|
| EP | 2698870 A1 | 2/2014 |
| WO | WO2004107693 A1 | 12/2004 |

(Continued)

OTHER PUBLICATIONS

Taiwanese Office Action; Mailed Feb. 20, 2017 for TW Application No. TW105108576; Summary of Office Action.

(Continued)

*Primary Examiner* — Kwang B Yao
*Assistant Examiner* — Nguyen Ngo
(74) *Attorney, Agent, or Firm* — Mendelsohn Dunleavy, P.C.; Steve Mendelsohn

(57) ABSTRACT

In certain embodiments, a macrocell base station (BS), such as an LSAS BS, estimates its backhaul channels with a small-cell BS (e.g., a relay or repeater) by averaging multiple instances of a received pilot signal repeatedly transmitted by the small-cell BS. Since the macrocell and small-cell BSs are stationary, averaging the received pilot signal transmissions over time results in the zero-temporal-mean time-dependent component of each backhaul channel as well as zero-temporal-mean noise and interference signals from other wireless nodes to substantially cancel out, enabling the macrocell BS to relatively infrequently estimate a relatively time-invariant, dominant component for each backhaul channel. The macrocell BS uses the estimated dominant components to generate user-data-based downlink transmissions to the small-cell BS. In this way, the processing to estimate channel state information (CSI) data for the backhaul channels is greatly reduced compared to conventional techniques.

14 Claims, 3 Drawing Sheets

(51) Int. Cl.
*H04B 7/0452* (2017.01)
*H04B 7/155* (2006.01)
*H04L 25/02* (2006.01)

(56) References Cited

U.S. PATENT DOCUMENTS

| | | | |
|---|---|---|---|
| 2011/0150117 A1* | 6/2011 | Zhou | H04B 7/0417 375/260 |
| 2011/0261785 A1* | 10/2011 | Kwon | H04W 36/30 370/331 |
| 2012/0147794 A1* | 6/2012 | Chung | H04W 72/0406 370/280 |
| 2012/0219041 A1 | 8/2012 | Lindoff et al. | |
| 2013/0028160 A1* | 1/2013 | Lee | H04L 27/2623 370/311 |
| 2013/0089021 A1 | 4/2013 | Gaal et al. | |
| 2013/0178181 A1* | 7/2013 | Pohlabeln | H01Q 1/242 455/226.1 |
| 2014/0328259 A1* | 11/2014 | Nammi | H04L 1/0026 370/329 |
| 2015/0098444 A1* | 4/2015 | Marzetta | H04L 5/0073 370/331 |
| 2015/0180561 A1* | 6/2015 | Jindal | H04L 25/03898 375/267 |
| 2015/0341096 A1* | 11/2015 | Gao | H04B 7/0634 370/278 |
| 2016/0173252 A1* | 6/2016 | Lee | H04B 7/26 370/329 |
| 2016/0174215 A1* | 6/2016 | Zhang | H04W 72/0413 370/329 |
| 2016/0249329 A1* | 8/2016 | Au | H04W 48/00 |

FOREIGN PATENT DOCUMENTS

WO   WO2014058375 A2   4/2014
WO   WO2014204868 A1   12/2014

OTHER PUBLICATIONS

Loadman, C., and Zhizhang Chen. "Retrodirective array using direct down-conversion and fixed point DSP for duplex digital communications." Radio and Wireless Symposium, 2006 IEEE, pp. 335-338.

International Search Report and Written Opinion; dated Jul. 18, 2016 for PCT Application No. PCT/IB2016/000516.

* cited by examiner

100

CHANNEL ESTIMATION TECHNIQUES FOR LSAS BACKHAUL AND THE LIKE

BACKGROUND

Field of the Invention

The present invention relates to wireless communications and, more specifically but not exclusively, to channel estimation in wireless communications systems employing macrocells having large-scale antenna system (LSAS also known as massive MIMO (multiple in, multiple out)) base stations and small cells having small-cell base stations like relays, repeaters, and full-fledged small-cell base stations.

Description of the Related Art

This section introduces aspects that may help facilitate a better understanding of the invention. Accordingly, the statements of this section are to be read in this light and are not to be understood as admissions about what is prior art or what is not prior art.

In conventional cellular communication systems having mobile devices that communicate wirelessly with base stations, each mobile device repeatedly transmits an uplink pilot signal based on a known, (absolutely or relatively) unique pilot sequence to its associated base station (BS). For each mobile unit, the base station receives the corresponding transmitted uplink pilot signal and estimates a different set of instantaneous (i.e., current) channel state information (CSI) data for the corresponding transmission channel between each mobile device antenna and each base station antenna. In a conventional cellular communication system, a base station characterizes the instantaneous CSI data for each of its communication channels in each time slot having a duration short enough to ensure that the mobile device does not move more than a quarter-wavelength of the channel's communication frequency.

To meet the ever-rising demands of wireless communications, cellular operators are deploying cellular communications systems that combine large-scale antenna system (LSAS) base stations and small-cell base stations, where each LSAS base station (BS) has tens or hundreds of antennas and is associated with a number of different small-cell BSs, and each small-cell BS communicates with a relatively small number of wireless users (e.g., mobile devices). Operating with a large ratio for the number of LSAS BS antennas to the total number of small-cell BS antennas under simultaneous service can yield large increases in both spectral efficiency and energy efficiency. As the number of antennas increases and power is commensurately reduced, conjugate beamforming on the forward link (i.e., downlink) and matched-filtering on the reverse link (i.e., uplink) asymptotically approach near-optimal performance.

In these systems, each small-cell BS functions as a wireless node communicating backhaul data wirelessly with its associated LSAS BS. Unfortunately, as the number of antennas increases, the processing load required to estimate the CSI data for each wireless backhaul channel using conventional techniques becomes prohibitively expensive.

SUMMARY

In one embodiment, a first antenna of a first wireless node of a wireless communications system receives multiple instances of a pilot signal repeatedly transmitted wirelessly from a first antenna of a second wireless node of the wireless communications system over a first wireless transmission channel to the first antenna of the first wireless node. The first wireless node generates an average received pilot signal from the multiple received instances of the pilot signal. The first wireless node estimates channel state information (CSI) data for the first wireless transmission channel based on the average received pilot signal. The first wireless node generates signals to be transmitted from the first antenna of the first wireless node via the first wireless transmission channel to the first antenna of the second wireless node based on the estimated CSI data for the first wireless transmission channel.

Another embodiment is a macrocell base station for a communications system further comprising one or more small-cell base stations. The macrocell base station comprising (a) a plurality of macrocell antennas, each macrocell antenna configured to (i) transmit downlink signals to the one or more small-cell base stations and (ii) receive uplink signals from the one or more small-cell base stations, and (b) macrocell transceiver circuitry configured to process the uplink signals received by the plurality of macrocell antennas and generate the downlink signals transmitted by the plurality of macrocell antennas. The transceiver circuitry is configured to (a) process received uplink signals corresponding to pilot signals transmitted by the one or more small-cell base stations; (b) generate, for each backhaul channel between a small-cell antenna and a macrocell antenna, a corresponding average received pilot signal over a plurality of different time periods; (c) generate estimated channel state information (CSI) data for each backhaul channel based on the corresponding average received pilot signal; and (d) generate downlink signals to be transmitted by the plurality of macrocell antennas to the one or more small-cell base stations based on the estimated CSI data for the backhaul channels.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
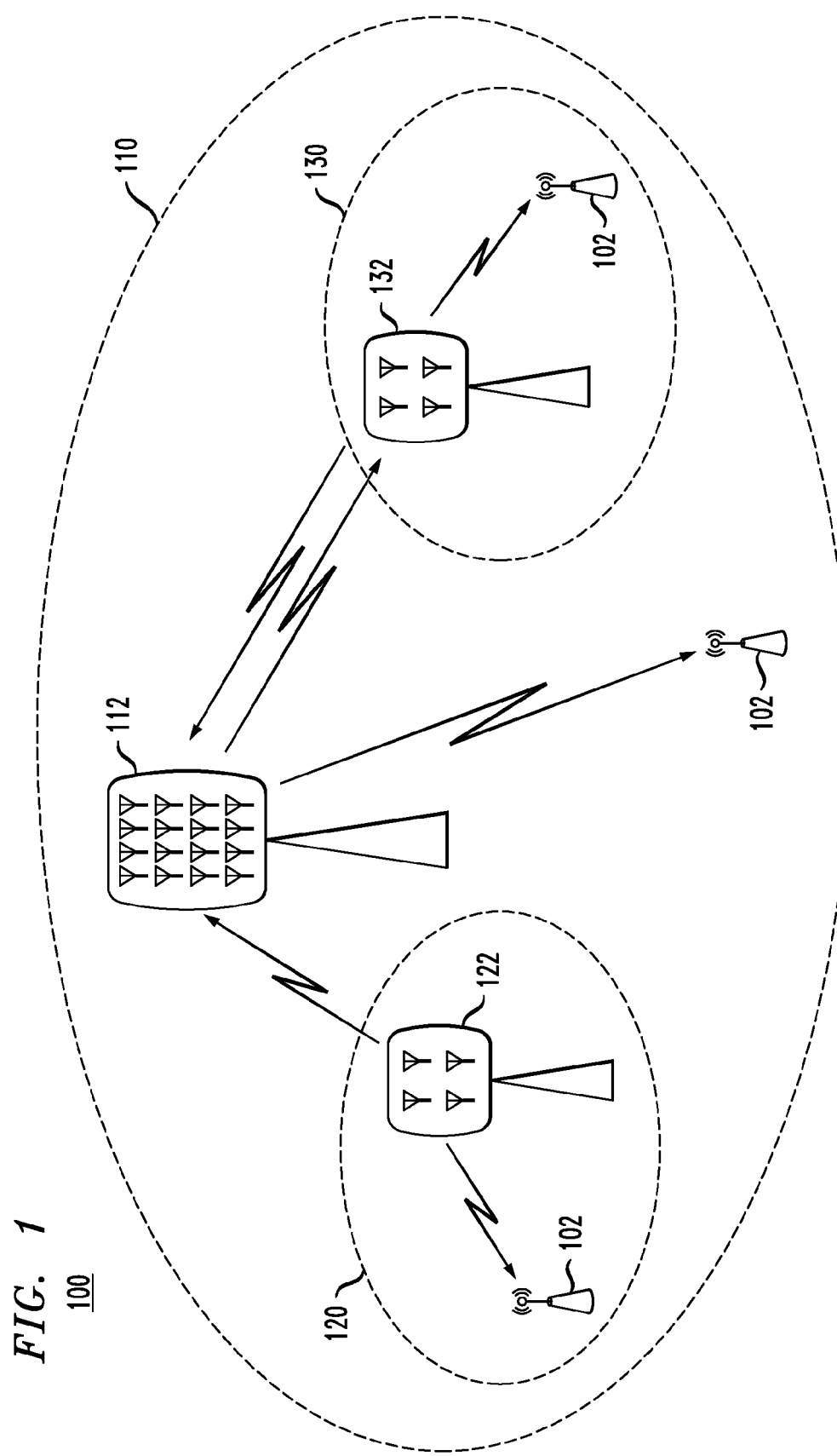
FIG. 1 is a simplified block diagram of a portion of an LSAS wireless communications system employing both macrocells and small cells according to one embodiment of the present disclosure.

FIG. 1 is a simplified block diagram of a portion of an LSAS wireless communications system 100 employing both macrocells and small cells according to one embodiment of the present disclosure. In particular, FIG. 1 shows a macrocell 110 comprising two small cells 120 and 130, where (i) LSAS base station 112 functions as the macrocell base station for macrocell 110, (ii) relay 122 functions as the small-cell base station for small cell 120, and (iii) repeater 132 functions as the small-cell base station for small cell 130. As indicated in FIG. 1, macrocell 110 also has a number of wireless users (e.g., mobile devices) 102, each of which wirelessly communicates directly with either LSAS BS 112, relay 122, or repeater 132. Relay 122 and repeater 132 also wirelessly communicate with LSAS BS 112.

Relay 122 and repeater 132 each can have one or more antennas, while LSAS BS 112 may have any suitably large number of BS antennas. Although not explicitly shown in FIG. 1, those skilled in the art will understand that LSAS BS 112, relay 122, and repeater 132 each have transceiver circuitry to generate outgoing signals to be transmitted by the one or more antennas and to process incoming signals received at the one or more antennas.

As used herein, the terms "macrocell" and "small cell" are used to indicate the relative sizes and relationships of the geographic regions covered by the base stations of those cells. In general, a macrocell contains one or more small cells, where each small cell BS services a number of wireless users located within its small-cell region, and each macrocell BS services all of its small-cell BSs as well as all of the wireless users located within its macrocell region. Note that a macrocell BS can service some wireless users directly while servicing other wireless users via its small-cell BSs.

A macrocell BS can control its repeaters to function as MIMO small-cell base stations to perform either closed-loop MIMO transmission or diversity combining. The main difference is that a repeater performs amplify and forward, while a multi-user MIMO relay performs decode and forward, and can generate pilots. Repeaters and relays perform only physical-layer functions. Full-fledged small-cell base stations perform L1 and L2 functions in the data-plane and control-plane functions. The benefit is that repeaters and relays will not be limited in their designed processing capacity to the processing capacity of full-fledged small-cell base stations (e.g., 32 simultaneously users). In either case, the macrocell BS is in charge of control-protocol processing and baseband processing, and there are significant multiplexing gains among the repeaters and relays.

There are two closed-loop beamforming options for the macrocell BS. The first beamforming option is for the macrocell BS to beamform to the mobile devices through the small-cell BSs. The second beamforming option is for the macrocell BS to beamform to the small-cell BSs only. For the first beamforming option, the macrocell BS can schedule the mobile devices to transmit pilot signals. Different small-cell BSs can use the same pilot signals at the same time. The macrocell BS will estimate the composite channel. Because it has different backhaul channels, the macrocell BS can distinguish between (i) channels for the mobile devices and (ii) channels for the small-cell BSs. For the second beamforming option, the macrocell BS adapts the coding rate based on SINR (signal-to-interference-and-noise ratio) estimations without explicit channel estimates. For both beamforming options, the macrocell BS transmits pilot signals to the small-cell BSs, where each small-cell BS can determine whether or not it needs to repeat the pilot signal. For example, using analog correlation circuits, a small-cell BS can determine whether the pilot signal is intended for it or not. Note that these transmissions are not full-duplex transmissions, where the uplink and downlink signals are transmitted using the same frequency at the same time. Rather, the pilot signal is repeated after a delay. The delay of signal is very short (less than 1 microsecond) if the delay circuitry is implemented in the analog domain. Because of this, the pilot is not transmitted continuously. The pilot is split into a number of transmissions with fixed gaps in between. Within the gaps, the repeater repeats the signals.

As used in this specification, a relay, such as relay 122 of FIG. 1, is type of a small-cell BS that is capable of originating uplink pilot signal transmissions to a macrocell BS, such as LSAS BS 112 of FIG. 1, while a repeater, such as repeater 132 of FIG. 1, is a type of small-cell BS that is incapable of originating uplink pilot signal transmissions to a macrocell BS. Instead, a repeater merely re-transmits back to the macrocell BS, a downlink pilot signal that the repeater receives from the macrocell BS. As described further below, the processing involved in estimating the CSI data for backhaul channels between a macrocell BS and a relay is different from the processing involved in estimating the CSI data for backhaul channels between a macrocell BS and a repeater.

In communications system 100 of FIG. 1, relay 122 and repeater 132 use the same air interface as the access link to the mobile devices 102. A relay is a small-cell BS that can decode, re-encode, and forward its received signal, while a repeater simply forwards its received signal without decoding and re-encoding. Relays and repeaters are less expensive to deploy than full-fledged small-cell base stations.

Figure 2:
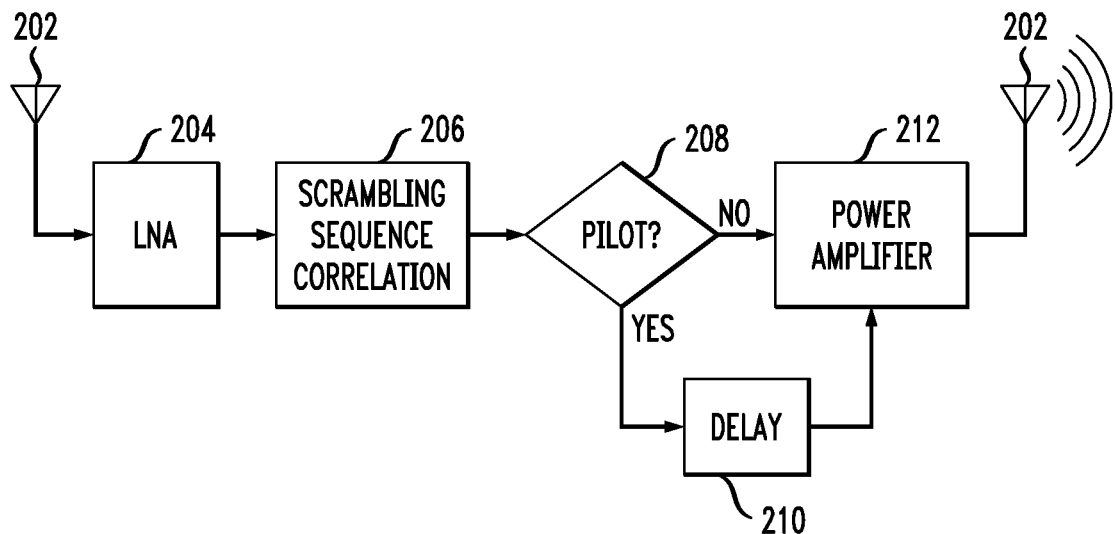
FIG. 2 is a simplified block flow diagram representing pilot signal processing performed by the repeater of FIG. 1.

FIG. 2 is a simplified block flow diagram representing pilot signal processing performed by repeater 132 of FIG. 1. In this particular implementation, repeater 132 has only one antenna 202. As shown in FIG. 2, a downlink signal from LSAS BS 112 of FIG. 1 is received at antenna 202 and amplified by low-noise amplifier (LNA) 204. If the received signal is strong enough (e.g., has a correlation energy above a specified threshold level), then the received signal is correlated (206) with an assigned pilot sequence known to repeater 132. If the repeater determines (208) that the received signal is not a pilot signal based on the repeater's assigned pilot sequence, then the signal is amplified by power amplifier 212 and re-transmitted by antenna 202. If, however, the repeater determines (208) that the received signal is such a pilot signal, then the signal is delayed (210) before being amplified by power amplifier 212 and re-transmitted by antenna 202.

Because LSAS BS 112, relay 122, and repeater 132 of FIG. 1 are stationary (e.g., not mobile) nodes, the characteristics of the wireless backhaul channels between LSAS BS 112 and relay 122 and between LSAS BS 112 and repeater 132 will change more slowly than the wireless channels associated with the conventional mobile devices 102. This opens up the possibility of using non-conventional techniques for estimating the CSI data for those backhaul channels.

The transmission of uplink pilot signals enables the macrocell BS to estimate the CSI data for its backhaul uplink channels and, by virtue of reciprocity, the CSI data for its backhaul downlink channels as well. In turn, the macrocell BS uses the estimated CSI backhaul channel data to perform pre-coding of user data for downlink transmissions that enable downlink nodes (e.g., relays or mobile devices) to successfully decode their respective user-data downlink signals.

Note that, in certain cellular communications systems, such as those employing OFDM (orthogonal frequency divisional multiplexing), pilot signals and user data signals are transmitted simultaneously. In other systems, pilot signals and user data signals can be transmitted sequentially. Furthermore, such systems may employ time-division duplexing (TDD) in which different uplink and downlink transmissions are separated in time and/or frequency-divisional duplexing (FDD) in which different uplink and downlink transmissions are separated in frequency. The channel estimation techniques of this disclosure can be employed in all such varieties of cellular communications systems.

Backhaul Channel Characteristics

Although macrocell and small-cell BSs are stationary, the backhaul channels between a particular macrocell BS and a particular small-cell BS are still subject to temporal variations due to changes in the surrounding environment, e.g., moving vehicles, movement of trees, etc. Nevertheless, each such backhaul channel is presumed to have a dominant component that is relatively time-invariant. Such a backhaul channel can be modeled with Rician temporal fading according to Equation (1) as follows:

$$h_{ij}(t) = h_{ij} + d_{ij}(t), \quad (1)$$

where $h_{ij}(t)$ represents the instantaneous CSI data for the backhaul channel between the ith macrocell antenna and the jth small-cell antenna, $h_{ij}$ represents the (relatively) time-invariant, dominant component of the CSI data, and $d_{ij}(t)$ represents the time-dependent component of the CSI data, which is assumed to be the result of a zero-temporal-mean, complex, Gaussian process representing the scattering/diffuse Rayleigh component of the channel. Note that it is assumed that channel reciprocity exists, such that $h_{ij}(t) = h_{ji}(t)$, $h_{ij} = h_{ji}$, and $d_{ij}(t) = d_{ji}(t)$.

As described in further detail below, macrocell BSs estimate the dominant CSI component $h_{ij}$ of each backhaul channel for use in downlink beamforming by averaging a number N of instances of the corresponding received uplink pilot signal over time. This technique takes advantage of the fact that the zero-temporal-mean, time-dependent CSI component $d_{ij}(t)$ will average towards zero for sufficiently large values of N. An additional advantage of this technique is that it is insensitive to pilot interference. Because interference from pilot signals transmitted by other conventional wireless nodes, such as the mobile devices 102, tends to have both zero-temporal-mean and zero-spatial-mean Gaussian characteristics, the averaging of the received uplink signals also causes pilot interference to average towards zero for sufficiently large values of N and/or for sufficiently large numbers of other wireless nodes.

Because the dominant CSI components $h_{ij}$ of the backhaul channels are assumed to be relatively time invariant, the processing employed by a macrocell BS to estimate the CSI data can be implemented less frequently than conventional quarter-wavelength-based CSI estimation techniques with each resulting set of estimated dominant CSI components being used for a relatively long time period. As such, the channel estimation processing load at the macrocell BS can be greatly reduced compared to conventional techniques. In some implementations, the set of CSI data estimated from the previous time period is used during the present time period, while updated average received uplink signals are being generated. In other implementations, running averages are used to update the estimated CSI data. The former implementations may be said to involve non-overlapping windows, while the latter implementations employ sliding windows.

Backhaul Channel Estimation for Relays

As described above, a relay is capable of originating the transmission of an uplink pilot signal to its macrocell BS. In that case, the received uplink pilot signal $y_{ij}(t)$ transmitted from the jth relay antenna and received at the ith macrocell antenna may be represented by Equation (2) as follows:

$$y_{ij}(t) = h_{ij}(t)s + x(t), \quad (2)$$

where s is the original pilot signal and x(t) represents noise and interference associated with other transmissions, e.g., from other nearby base stations or even transmitters of other wireless communications systems. As is typical for wireless digital transmissions, x(t) is assumed to follow a Gaussian distribution with zero temporal mean.

To estimate the CSI data for the ij backhaul channel, the macrocell BS generates an average received uplink pilot signal $Y_{ij}$ over N previous time periods, according to Equation (3) as follows:

$$Y_{ij} = \frac{1}{N}\sum_{t=1}^{N} y_{ij}(t). \quad (3)$$

Note that the N previous time periods can be, but do not have to be consecutive time periods.

Substituting Equations (1) and (2) into Equation (3) yields Equation (4) as follows:

$$Y_{ij} = h_{ij}s + \frac{1}{N}\sum_{t=1}^{N} d_{ij}(t)s + \frac{1}{N}\sum_{t=1}^{N} x(t). \quad (4)$$

Since the time-dependent component $d_{ij}(t)$ and the noise/interference signal x(t) are both presumed to have zero-temporal-mean characteristics, the last two terms of Equation (4) will both tend towards zero for sufficiently large values of N, resulting in Equation (5) as follows:

$$Y_{ij} = h_{ij}s. \quad (5)$$

In general, the value of N should be selected to be large enough for the last two terms in Equation (4) to be substantially equal to zero, but not so large to invalidate the assumption that the dominant CSI component is time invariant.

Based on Equation (5), the macrocell BS can estimate the CSI data $h_{ij}$ for the ij backhaul channel based on the known pilot signal s and the generated average uplink signal $Y_{ij}$ according to Equation (6) as follows:

$$h_{ij} = Y_{ij}/s. \quad (6)$$

Figure 3:
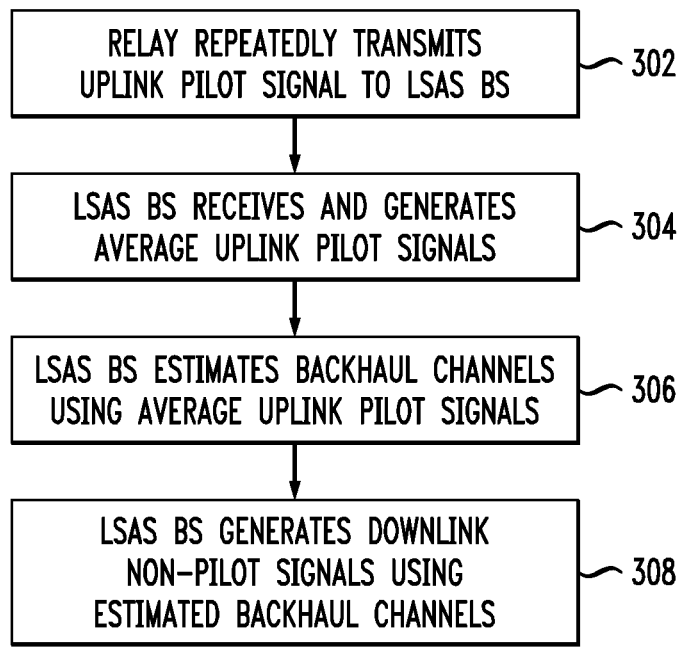
FIG. 3 is a flow diagram representing the processing involved in estimating backhaul channels between the LSAS BS and each antenna at the relay of FIG. 1.

FIG. 3 is a flow diagram representing the processing involved in estimating the CSI data $h_{ij}$ for backhaul channels between LSAS BS 112 and each antenna at relay 122 of FIG.

1. If relay 122 has multiple antennas, then the processing of FIG. 3 is sequentially repeated for each relay antenna.

In step 302, relay 122 repeatedly transmits the same uplink pilot signal s from its one or more relay antennas to LSAS BS 112. In step 304, LSAS BS 112 averages multiple (i.e., N) instances of the received uplink signal $y_{ij}(t)$ of Equation (2) for each BS antenna to generate an average received uplink signal $y_{ij}$ of Equations (3)-(5) for each backhaul channel. In step 306, LSAS BS 112 estimates each backhaul channel $h_{ij}$ of Equation (6) using the corresponding average received uplink signal. In step 308, LSAS BS 112 uses the estimated backhaul channels to generate downlink non-pilot signals for transmission to relay 122.

Backhaul Channel Estimation for Repeaters

As described above, a repeater is incapable of originating the transmission of an uplink pilot signal to its macrocell BS. Instead, a repeater can only re-transmit back to its macrocell BS, a downlink pilot signal that it receives from the macrocell BS. In that case, the received uplink pilot signal $y_{kj}(t)$ transmitted from the jth relay antenna and received at the kth macrocell antenna may be represented by Equation (7) as follows:

$$y_{kj}(t)=h_{jk}(t)(h_{ij}(t-1)s+x(t-1))+x(t), \quad (7)$$

where s is the original pilot signal transmitted by the macrocell BS, $h_{kj}(t)$ represents the instantaneous channel characteristics of the backhaul channel between the jth repeater antenna and the kth macrocell antenna, $h_{ij}(t-1)$ represents the previous channel characteristics of the backhaul channel between the ith macrocell antenna and the jth repeater antenna, $(h_{ij}(t-1)s+x(t-1))$ represents the received downlink pilot signal transmitted from the ith macrocell antenna to the jth repeater antenna, and $x(t)$ and $x(t-1)$ represent the current and previous zero-temporal-mean, Gaussian noise/interference signals, respectively.

In one possible implementation, the ith macrocell antenna is designated as a reference macrocell antenna for the estimation of repeater backhaul channels. To estimate the repeater backhaul channels for all of the macrocell antennas, the macrocell BS starts with the reference macrocell antenna i by processing the re-transmitted pilot signal $y_{ij}(t)$ received from the jth repeater antenna. In that case, k=i, and Equation (7) becomes Equation (8) as follows:

$$y_{ij}(t)=h_{ij}(t)(h_{ij}(t-1)s+x(t-1))+x(t). \quad (8)$$

As in the case of relays, for repeaters, to estimate the CSI data for the ij backhaul channel, the macrocell BS generates an average received pilot signal $Y_{ij}$ over N the previous time periods, according to Equation (9) as follows:

$$Y_{ij} = \frac{1}{N}\sum_{t=1}^{N} y_{ij}(t). \quad (9)$$

Substituting Equations (1) and (8) into Equation (9) yields Equation (10) as follows:

$$Y_{ij} = \frac{1}{N}\sum_{t=1}^{N}(h_{ij}+d_{ij}(t))(h_{ij}+d_{ij}(t-1))s + \frac{1}{N}\sum_{t=1}^{N}(h_{ij}+d_{ij}(t))x(t-1) + \frac{1}{N}\sum_{t=1}^{N}x(t). \quad (10)$$

Since the time-dependent components $d_{ij}(t)$ and $d_{ij}(t-1)$ and the noise/interference signals $x(t)$ and $x(t-1)$ are all presumed to have zero-temporal-mean characteristics, for sufficiently large values of N, most of the terms in Equation (10) will tend to zero, resulting in Equation (11) as follows:

$$Y_{ij}=h_{ij}^2 s. \quad (11)$$

Here, too, the value of N should be selected to be large enough for those terms in Equation (10) to be substantially equal to zero, but not so large as to invalidate the assumption that the dominant CSI component is time invariant.

Based on Equation (11), the macrocell BS can estimate the CSI data for the ij reference backhaul channel based on the known pilot signal s and the generated average uplink signal $Y_{ij}$ according to Equation (12) as follows:

$$h_{ij}=\sqrt{Y_{ij}/s} \quad (12)$$

Once the dominant CSI component $h_{ij}$ for the ij reference backhaul channel is estimated, the macrocell BS can use that information to estimate the dominant CSI component $h_{kj}$ for each of the M-1 other, non-reference backhaul channels between repeater antenna j and the macrocell BS. In particular, for each kj backhaul channel between repeater antenna j and macrocell antenna k, k≠i, the macrocell BS generates an average received pilot signal $Y_{kj}$ over N previous time periods, according to Equation (13) as follows:

$$Y_{kj} = \frac{1}{N}\sum_{t=1}^{N} y_{kj}(t). \quad (13)$$

Substituting Equations (1) and (7) into Equation (13) yields Equation (14) as follows:

$$Y_{kj} = \frac{1}{N}\sum_{t=1}^{N}(h_{kj}+d_{kj}(t))(h_{ij}+d_{ij}(t-1))s + \frac{1}{N}\sum_{t=1}^{N}(h_{kj}+d_{kj}(t))x(t-1) + \frac{1}{N}\sum_{t=1}^{N}x(t) \quad (14)$$

Since the time-dependent components $d_{kj}(t)$ and $d_{ij}(t-1)$ and the noise/interference signals $x(t)$ and $x(t-1)$ are all presumed to have zero-temporal-mean characteristics, for sufficiently large values of N, most of the terms in Equation (14) will tend to zero, resulting in Equation (15) as follows:

$$Y_{kj}=h_{kj}h_{ij}s. \quad (15)$$

Here, too, the value of N should be selected to be large enough for those terms in Equation (14) to be substantially equal to zero, but not so large as to invalidate the assumption that the dominant CSI component is time invariant.

Based on Equation (15), the macrocell BS can estimate the CSI data for the kj non-reference backhaul channel from the known pilot signal s, the generated average uplink signal $Y_{kj}$, and the estimated CSI $h_{ij}$ for the ij reference backhaul channel according to Equation (16) as follows:

$$h_{kj}=Y_{kj}/(h_{ij}s). \quad (16)$$

Figure 4:
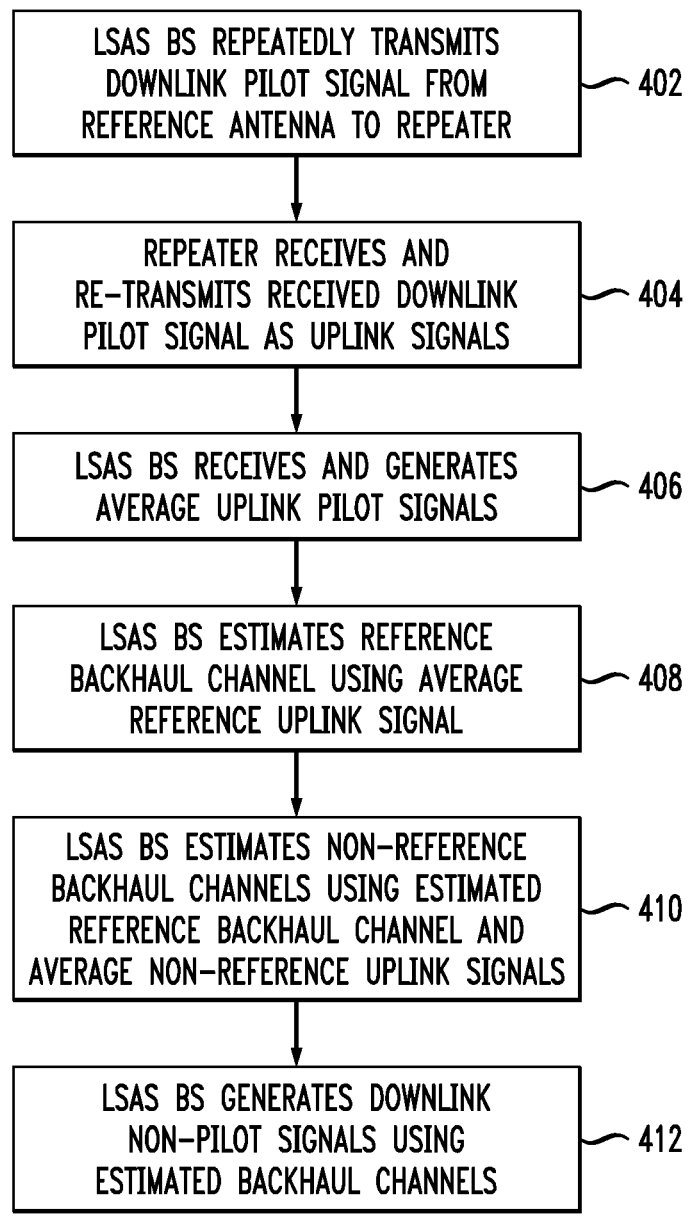
FIG. 4 is a flow diagram representing the processing involved in estimating backhaul channels between the LSAS BS and each antenna at the repeater of FIG. 1.

FIG. 4 is a flow diagram representing the processing involved in estimating the CSI data $h_{ij}$ for backhaul channels between LSAS BS 112 and each antenna at repeater 132 of FIG. 1. If repeater 132 has multiple antennas, then the processing of FIG. 4 is sequentially repeated for each repeater antenna.

In step 402, LSAS BS 112 repeatedly transmits the same downlink pilot signal s from its reference antenna i to repeater 132. In step 404, repeater 132 receives each downlink pilot signal at its jth antenna as received downlink pilot signal ($h_{ij}(t)s+x(t)$), recognizes that it is a pilot signal, delays the received pilot signal, and re-transmits the delayed pilot signal back to LSAS BS 112, thereby sequentially re-transmitting the most-recently received downlink pilot signal back to LSAS BS 112. In step 406, LSAS BS 112 averages multiple (i.e., N) instances of the received uplink signal $y_{kj}(t)$ of Equation (7) for each BS antenna to generate an average received uplink signal $Y_{kj}$ of Equations (13) and (14) for each backhaul channel. In step 408, for the special case in which the CS antenna k that receives the uplink signal is the reference antenna i, LSAS BS 112 estimates the backhaul channel $h_{ij}$ of Equation (12) using the corresponding average received uplink signal $Y_{ij}$ of Equations (9)-(11). In step 410, LSAS BS 112 uses the estimated reference backhaul channels $h_{ij}$ of step 408 and the corresponding average received uplink signals $Y_{kj}$ of Equations (13)-(15) to estimate the rest of the backhaul channels $h_{kj}$ of Equation (16). In step 412, LSAS BS 112 uses the estimated backhaul channels to generate downlink non-pilot signals for transmission to repeater 132.

Beamforming

After estimating the dominant CSI components for all of its backhaul channels for a relay (using Equation (6) or for a repeater (using Equations (12) and (16)), the macrocell BS can generate its downlink non-pilot (e.g., user-data-based) signals for transmission to that relay or repeater using, for example, either conjugate beamforming or zero-forcing beamforming.

In conjugate beamforming, for each macrocell antenna m, the macrocell BS pre-codes the user data signal $q_j$ to be transmitted to the jth relay/repeater antenna using the complex conjugate $h^*_{mj}$ of the estimated dominant CSI component $h_{mj}$ for the mj backhaul channel. In that case, the aggregate downlink signal $y_j(t)$ received at the jth relay/repeater antenna from all M macrocell antennas can be represented by Equation (17) as follows:

$$y_j(t) = \sum_{m=1}^{M} h^*_{mj}(h_{mj} + d_{mj}(t))q_j, \qquad (17)$$

where ($h_{mj}+d_{mj}(t)$) represents the instantaneous CSI for the mj backhaul channel. Note that Equation (17) ignores zero-temporal-mean noise and interference from signals intended for other wireless nodes, all of which should sum to zero in the aggregate received downlink signal $y_j(t)$.

Expanding Equation (17) and recognizing that the product $h^*_{mj}h_{mj}$ is equal to $|h_{mj}|^2$ yields Equation (18) as follows:

$$y_j(t) = \sum_{m=1}^{M} |h_{mj}|^2 q_j + \sum_{m=1}^{M} h^*_{mj} d_{mj}(t) q_j. \qquad (18)$$

Note that, for stationary macrocell BSs, relays, and repeaters having dominant time-invariant CSI components $h_{mj}$, the first term in Equation (18) will be much larger than the time-dependent second term.

In zero-forcing beamforming, for each macrocell antenna m, the macrocell BS computes beamforming weights and applies them. The beamforming weight computation is different between conjugate beamforming and zero-forcing beamforming. In zero-forcing beamforming, the beamforming weights that are applied to the signals are the same. In that case, the K-element aggregate received signal vector Y representing the downlink signals received at all K of the relays and repeaters in the macrocell may be represented by Equation (19) as follows:

$$Y=(H_0+D(t))^T(cH^*_0(H_0^T H^*_0)^{-1})Q, \qquad (19)$$

where ($H_0+D(t)$) represents the (K×K) channel matrix consisting of the relatively time-invariant dominant CSI component channel matrix $H_0$ and the time-dependent CSI component channel matrix $D(t)$, $(cH^*_0(H_0^T H^*_0)^{-1})$ represents the (K×K) pre-coding matrix applied at the macrocell BS, where c is a scalar, and Q represents the K-element user data vector.

Expanding Equation (19) and recognizing that $H_0 H^*_0 (H_0^T H^*_0)^{-1}=1$ yields Equation (20) as follows:

$$Y=cQ+D(t)^T cH^*_0(H_0^T H^*_0)^{-1} Q=cQ+\hat{N}Q, \qquad (20)$$

where $\hat{N}$ is a (K×K) matrix in which each element is a linear combination of zero-spatial-mean Gaussian random variables and is therefore also zero-spatial-mean Gaussian. As such, the second term $\hat{N}Q$ in Equation (20) is zero on average.

Channel Estimation and Beamforming to Mobile Devices

If a small-cell BS (e.g., a repeater or a relay) has multiple antennas, then the macrocell BS can also beamform to the one or more mobile devices associated with that small-cell BS. The first step is to estimate the channel between each small-cell BS antenna and each mobile device, e.g., using conventional quarter-wavelength-based CSI estimation techniques. The macrocell BS can schedule each mobile device to transmit an uplink pilot signal. When the small-cell BS receives the uplink pilot signal from a mobile device, the small-cell BS can use each of its antennas to take turns repeating the received uplink pilot signal.

The composite channels between the mobile device and the macrocell BS via the small-cell BS can be estimated using the same techniques described above for the backhaul channels. The macrocell BS can then use the estimated composite channel CSI to beamform to all of the mobile devices associated with that small-cell BS. Note that the macrocell BS will still need to estimate the backhaul channels to each small-cell BS in order to beamform control-channel signals to the small-cell BS, where those control-channel signals are broadcasted to all mobile devices associated with that small-cell BS.

Although the disclosure has been described in the context of cellular systems that employ either conjugate beamforming or zero-forcing beamforming for downlink transmissions, the disclosure also include cellular systems that employ other suitable techniques for downlink transmissions.

Although the disclosure has been described in the context of cellular systems having macrocells with LSAS base stations and small cells with either relays or repeaters, the disclosure also includes cellular systems having (i) macrocells with non-LSAS base stations instead of or in addition to macrocells with LSAS base stations and/or (ii) small cells with full-fledged small-cell base stations instead of or in addition to small cells with relays and/or small cells with repeaters. In general, the CSI estimation techniques described in this disclosure are applicable to any wireless channels between any two nodes whose channel characteristics change relatively slowly over time, whether one or both of those two nodes are stationary or mobile.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method comprising:
    (a) a first antenna of a first wireless node of a wireless communications system receiving multiple instances of a pilot signal from a second wireless node over a first wireless transmission channel;
    (b) the first wireless node generating an average received pilot signal from the multiple received instances of the pilot signal;
    (c) the first wireless node estimating channel state information (CSI) data for the first wireless transmission channel based on the average received pilot signal; and
    (d) the first wireless node generating signals to be transmitted from the first antenna of the first wireless node via the first wireless transmission channel toward the second wireless node based on the estimated CSI data for the first wireless transmission channel, wherein:
    the wireless communications system is a cellular communications system;
    the first wireless node is a macrocell base station (BS) of the cellular communications system;
    the second wireless node is a small-cell BS of the cellular communications system;
    the macrocell BS has multiple macrocell antennas;
    the small-cell BS has one or more small-cell antennas; and
    steps (a)-(d) are repeated for each wireless transmission channel between each different macrocell antenna and each different small-cell antenna.

2. The method of claim 1, wherein the second wireless node originates the transmission of the pilot signal.

3. The method of claim 1, wherein:
    the first wireless node originates the transmission of the pilot signal to the second wireless node; and
    the second wireless node receives the pilot signal from the first wireless node and re-transmits the received pilot signal back to the first wireless node.

4. The method of claim 1, wherein:
    the cellular communications system comprises multiple small-cell BSs; and
    steps (a)-(d) are repeated for each small-cell BS.

5. The method of claim 1, wherein the macrocell BS is a large scale antenna system (LSAS) BS.

6. The method of claim 1, wherein the small-cell BS is a relay that originates the transmission of the pilot signal for each wireless transmission channel.

7. The method of claim 1, wherein:
    the small-cell BS is a repeater;
    the macrocell BS originates the transmission of the pilot signal to the repeater for each wireless transmission channel; and
    the repeater receives each pilot signal from the macrocell BS and re-transmits each received pilot signal back to the macrocell BS, wherein the repeater delays re-transmission of each received pilot signal to avoid full-duplex transmission of the pilot signal.

8. The method of claim 7, wherein, for each repeater antenna:
    the macrocell BS transmits the pilot signal from a reference macrocell antenna to the repeater antenna;
    the repeater re-transmits the received pilot signal back to the macrocell BS;
    the macrocell BS averages the re-transmitted pilot signal received at each macrocell antenna;
    for the reference macrocell antenna, the macrocell BS estimates CSI data for the reference wireless transmission channel between the reference macrocell antenna and the repeater antenna based on the average received re-transmitted pilot signal for the reference wireless transmission channel; and
    for each non-reference macrocell antenna, the macrocell BS estimates CSI data for the non-reference wireless transmission channel between the non-reference macrocell antenna and the repeater antenna based on (i) the estimated CSI data for the reference wireless transmission channel and (ii) the average received re-transmitted pilot signal for the non-reference wireless transmission channel.

9. The method of claim 1, wherein:
    step (a) comprises the first antenna of the first wireless node of the wireless communications system receiving the multiple instances of the pilot signal repeatedly transmitted wirelessly from a first antenna of the second wireless node of the wireless communications system over the first wireless transmission channel to the first antenna of the first wireless node; and step (d) comprises the first wireless node generating signals to be transmitted from the first antenna of the first wireless node via the first wireless transmission channel to the first antenna of the second wireless node based on the estimated CSI data for the first wireless transmission channel.

10. The method of claim 9, wherein:

the first wireless node is a large scale antenna system (LSAS) base station (BS) of the cellular communications system;

the cellular communications system comprises multiple small-cell BSs;

steps (a)-(d) are repeated for each small-cell BS;

the LSAS BS has multiple LSAS antennas;

the small-cell BS has one or more small-cell antennas;

steps (a)-(d) are repeated for each wireless transmission channel between each different LSAS antenna and each different small-cell antenna;

for each repeater antenna:
the LSAS BS transmits the pilot signal from a reference LSAS antenna to the repeater antenna;
the repeater re-transmits the received pilot signal back to the LSAS BS;
the LSAS BS averages the re-transmitted pilot signal received at each LSAS antenna;
for the reference LSAS antenna, the LSAS BS estimates CSI data for the reference wireless transmission channel between the reference LSAS antenna and the repeater antenna based on the average received re-transmitted pilot signal for the reference wireless transmission channel; and
for each non-reference LSAS antenna, the LSAS BS estimates CSI data for the non-reference wireless transmission channel between the non-reference LSAS antenna and the repeater antenna based on (i) the estimated CSI data for the reference wireless transmission channel and (ii) the average received re-transmitted pilot signal for the non-reference wireless transmission channel.

11. A macrocell base station for a communications system further comprising one or more small-cell base stations, the macrocell base station comprising:

a plurality of macrocell antennas, each macrocell antenna configured to (i) transmit downlink signals to the one or more small-cell base stations and (ii) receive uplink signals from the one or more small-cell base stations; and macrocell transceiver circuitry configured to process the uplink signals received by the plurality of macrocell antennas and generate the downlink signals transmitted by the plurality of macrocell antennas, wherein the transceiver circuitry is configured to:

(a) process received uplink signals corresponding to pilot signals transmitted by the one or more small-cell base stations;

(b) generate, for each backhaul channel between a small-cell antenna and a macrocell antenna, a corresponding average received pilot signal over a plurality of different time periods;

(c) generate estimated channel state information (CSI) data for each backhaul channel based on the corresponding average received pilot signal; and (d) generate downlink signals to be transmitted by the plurality of macrocell antennas to the one or more small-cell base stations based on the estimated CSI data for the backhaul channels.

12. The macrocell base station of claim 11, wherein:

at least one small-cell base station is a relay that originates transmission of a pilot signal based on a known pilot sequence to the macrocell base station;

each macrocell antenna receives the transmitted pilot signal from the repeater; and the macrocell transceiver circuitry generates the estimated CSI data for the backhaul channel corresponding to the relay and each macrocell antenna based on the quotient of (i) the corresponding average received pilot signal and (ii) the known pilot sequence.

13. The macrocell base station of claim 12, wherein:

at least one small-cell base station is a repeater;

the macrocell base station transmits a pilot signal based on a known pilot sequence from a reference macrocell antenna;

the repeater receives the transmitted pilot signal and re-transmits the received pilot signal to the macrocell base station;

each macrocell antenna receives the re-transmitted pilot signal from the repeater;

the macrocell transceiver circuitry generates estimated CSI data for a reference backhaul channel corresponding to the repeater and the reference macrocell antenna based on the square root of the quotient of (i) the corresponding average received pilot signal and (i) the known pilot sequence; and the macrocell transceiver circuitry generates estimated CSI data for each non-reference backhaul channel corresponding to the repeater and each non-reference macrocell antenna based on the quotient of (i) the corresponding average received pilot signal and (ii) the product of (a) the estimated CSI data for the reference backhaul channel and (b) the known pilot sequence.

14. The macrocell base station of claim 11, wherein the macrocell base station is an LSAS base station of the cellular communications system.

* * * * *